(12) United States Patent
Damsi

(10) Patent No.: US 8,567,848 B2
(45) Date of Patent: Oct. 29, 2013

(54) MODULAR HEADBOARD AND APPLICATION IN TARPAULIN INDUSTRY

(75) Inventor: Everest Damsi, Waterdown (CA)

(73) Assignee: Roll-Tite Corp., Ontario (CA)

( * ) Notice: Subject to any disclaimer, the term of this patent is extended or adjusted under 35 U.S.C. 154(b) by 152 days.

(21) Appl. No.: 13/041,897

(22) Filed: Mar. 7, 2011

(65) Prior Publication Data

US 2011/0221233 A1  Sep. 15, 2011

(30) Foreign Application Priority Data

Mar. 12, 2010 (CA) .................................... 2696457

(51) Int. Cl.
*B62D 33/04* (2006.01)

(52) U.S. Cl.
USPC ...................................................... 296/186.1

(58) Field of Classification Search
USPC ............ 296/181.5, 180.1, 180.4, 186.1, 24.4, 296/105, 100.12, 182.1, 186.4
See application file for complete search history.

(56) References Cited

U.S. PATENT DOCUMENTS

| | | | | |
|---|---|---|---|---|
| 2,471,917 A * | 5/1949 | Wilson | ...................... | 296/186.1 |
| 6,419,301 B1 * | 7/2002 | Tuerk | .......................... | 296/186.1 |
| 6,793,273 B1 * | 9/2004 | Tuerk | .......................... | 296/186.1 |
| 7,494,177 B2 * | 2/2009 | Henning | .................... | 296/186.1 |
| 7,946,644 B1 * | 5/2011 | Foster | ........................ | 296/186.1 |
| 2009/0236873 A1 * | 9/2009 | Kroppe | ...................... | 296/186.1 |
| 2011/0221233 A1 * | 9/2011 | Damsi | ........................ | 296/186.1 |

\* cited by examiner

*Primary Examiner* — Glenn Dayoan
*Assistant Examiner* — Gregory Blankenship
(74) *Attorney, Agent, or Firm* — Scully, Scott, Murphy & Presser, P.C.

(57) ABSTRACT

A modular headboard system is provided. The modular headboard system can be positioned on a vehicle, such as a truck, trailer, rail car, or on a shipping structure such as a shipping pallet. The modular headboard system can also be used in association with a cover system for covering or enclosing cargo during shipping on a vehicle or shipping structure. The modular headboard system comprises a plurality of component members that are assembled to form a headboard. The headboard system comprises a headboard, a pair of wings connected to opposite sides of the headboard and extending at least partially above the headboard, and a headboard extension member disposed at the top of the headboard and connected to the wings. The wings and the headboard extension member can be releasably connected to the headboard for easily assembly and disassembly of the headboard system.

14 Claims, 4 Drawing Sheets

MODULAR HEADBOARD AND APPLICATION IN TARPAULIN INDUSTRY

FIELD

The present invention relates to cover systems for covering or enclosing cargo during shipping. More particularly, the present invention relates to a modular headboard system that can be used in association with such a cover system.

BACKGROUND

Tarpaulin cover systems are commonly used to cover cargo being transported by truck, train, ship, and other vehicles. It is often desirable to cover cargo to protect it from the elements. It may also be desirable to shield the cargo from view.

Cargo that is to be transported may be positioned directly on a vehicle, such as on a truck bed, trailer, or rail car. Alternatively, the cargo may first be positioned on a shipping base, such as a shipping or cargo pallet. The shipping base may then be placed on or in the vehicle for transport. In either instance, it is often desirable to cover the cargo being transported.

Tarpaulin cover systems are particularly common in the trucking industry. One type of shipping configuration comprises a rigid enclosure that fully encloses a cargo area. Such enclosures are commonly found on the back of trucks and trailers, and often have one or more openings in the enclosure for loading and unloading cargo. It is common for at least one opening to be disposed in the rear end of the enclosure. However, such fully enclosed and permanent cargo areas are not well suited for the loading and unloading of certain types of cargo. For example, very large or very heavy items are most easily loaded onto a vehicle, trailer, or shipping base from the top or the side using a crane, forklift or other lifting device. Therefore such large or heavy items are more easily loaded onto a vehicle, trailer, or base having no sidewalls or no roof. Flatbed trucks and trailers are well adapted to carry such loads. However, as discussed above, it is often desirable to cover the loaded cargo during transport, as well as during storage. Tarpaulin cover systems provide an attractive solution as they can be quickly and easily retracted or removed to expose the entire cargo area during loading and unloading.

Tarpaulin cover systems are known in the art. For example, flexible tarpaulin systems for highway trailers have been disclosed in U.S. Pat. No. 5,152,575 to DeMonte et al., U.S. Pat. No. 5,538,313 to Henning, and U.S. Pat. No. 6,511,117 to Henning.

Retractable tarpaulin systems can come in a flat-top style, as taught by the two Henning patents, or in a peaked style, as taught by DeMonte. An increasingly common style of flexible cover system comprises a plurality of bows that support a flexible cover. The bows, and thus the cover, are moveable, typically along the length of the base or vehicle, and may be retracted in an accordion-like manner to expose a cargo area. The lower ends of each bow typically comprise sliding means, such as one or more wheels or rollers, which ride in or on a pair of tracks or rails on the base or vehicle.

In some tarp cover systems, a headboard or bulkhead is mounted transversely on the front end of the trailer or truck bed. The headboard prevents cargo from sliding or otherwise moving off of the front end of the trailer or truck bed. The headboard can also serve as a connection place and support structure for the front-most bow of a tarp cover system. In some systems, the front most-bow will be fixedly connected to the headboard, whereas in other systems the bow will be detachably connected to the headboard.

In existing tarp cover systems, the bow is detachably connected to the headboard in one of a variety of different ways, including by way of c-clamps, over-centre clamps, or latch and pin connections. Some of these connection means require a significant amount of time and effort to engage and disengage. Others are not user-operable from outside of the cargo area. It is therefore desirable to develop a headboard having at least one quick release locking mechanism for releasably engaging and locking an end bow of a tarp cover system to the headboard. The locking mechanism can engage the bow in a plurality of regions in order to allow for a sufficient and substantially uniform degree of tension to be applied to the tarp cover. Moreover, it is also desirable that the locking mechanism be operable by a person from the exterior of the cargo enclosure (e.g. tarp cover).

In addition, many existing headboards are designed for specific applications and are therefore fabricated with specific dimensions. The heights of such headboards are generally not adjustable. Therefore a particular headboard having a certain height may not be well suited for use with other tarp covering systems of different heights. It is therefore desirable to develop a height-adjustable headboard. A height adjustable headboard can be used with tarp cover systems of different heights.

Moreover, many existing headboards are fully assembled during fabrication. The components of some of these headboards are welded, riveted, or otherwise bonded together. This makes it difficult and impractical to disassemble such headboards for shipping and storage purposes. Therefore it is also desirable to develop a headboard that is modular in nature and that can be easily assembled and disassembled.

For the foregoing reasons, it can be appreciated that a need exists for a modular headboard that can be easily assembled from its component parts and also easily disassembled. There is also a need for a headboard that is height-adjustable. There is a further need for a headboard having a locking mechanism for releasably engaging and locking an end bow of a tarp cover system to the headboard.

SUMMARY

A modular headboard system is provided comprising a plurality of component members that are assembled to form a headboard. In one aspect, the overall height of the headboard is adjustable. Furthermore, in one aspect the headboard system comprises a locking mechanism for locking and securing a cover system to the headboard.

In particular, the present disclosure is directed to a modular headboard system comprising a headboard having a top edge, a bottom edge, a first side edge, and a second side edge opposite the first side edge; a first wing connected to the first side edge and extending at least partially above the top edge of the headboard; a second wing connected to the second side edge and extending at least partially above the top edge of the headboard; and a headboard extension member disposed at the top edge of the headboard and connected to upper portions of the first and second wings.

BRIEF DESCRIPTION OF THE DRAWINGS

The present disclosure will be better understood having regard to the drawings in which.

DETAILED DESCRIPTION

The present modular headboard system is described in one embodiment in the following disclosure with reference to the Figures. While this embodiment is described in the context of a headboard adapted for use with a tarp cover system on a trailer or truck bed comprising one or more movable support bows, the scope of the present disclosure is not intended to be limited to tarp cover systems, to cover systems on trailers or truck beds, or to cover systems comprising one or more support bows. The present modular headboard system can be used with other cargo cover systems, on other vehicles, such as a rail car, and on shipping devices, such as a shipping pallet.

The various features and components of the present modular headboard are now described with reference to the Figures.

Figure 1:
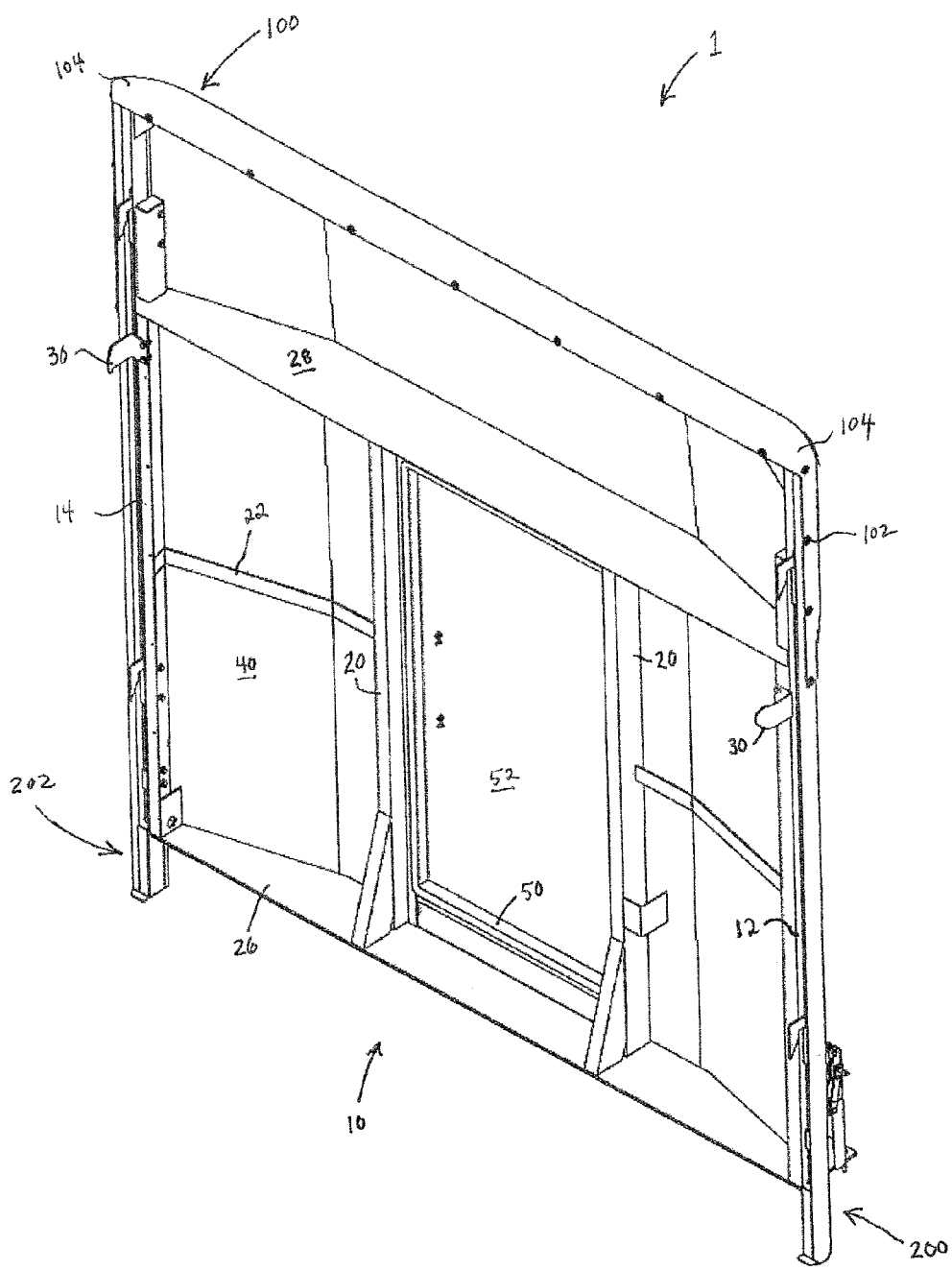
FIG. 1 is a rear perspective view of one embodiment of the modular headboard system.

FIG. 1 shows one embodiment of the present headboard system. Headboard system 1 comprises a headboard 10, a headboard extension 100, and a pair of vertically extending wings 200 and 202. These components are more discernable in FIG. 2, which shows the headboard system of FIG. 1 in an exploded view.

Figure 4:
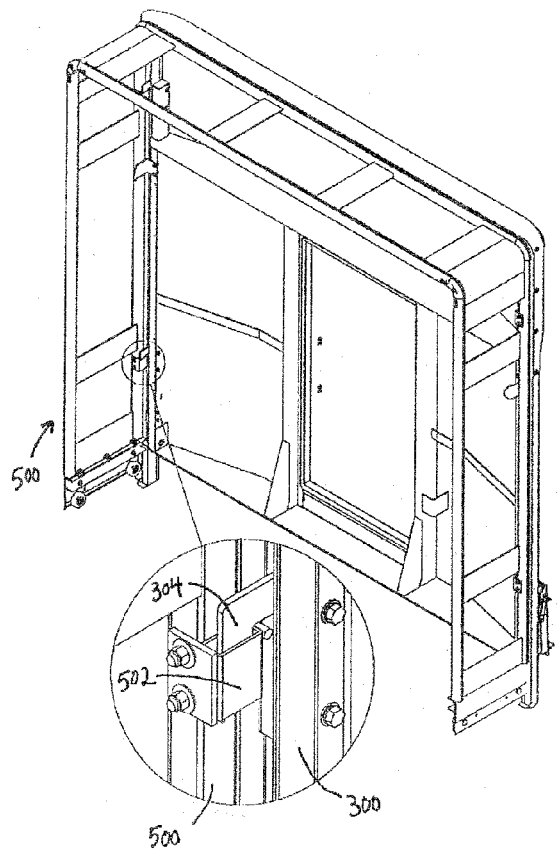
FIG. 4 is a rear perspective view of the modular headboard system shown in FIG. 1 engaged with a bow of a cover system.
Figure 5:
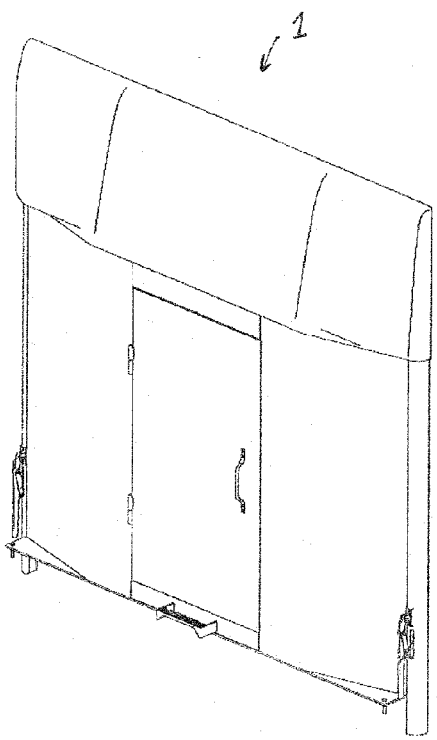
FIG. 5 is a front perspective view of the embodiment shown in FIG. 1.
Figure 6:
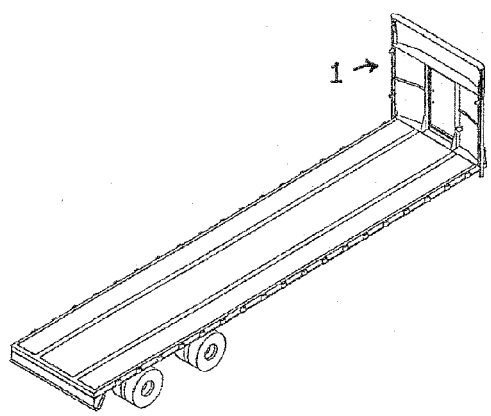
FIG. 6 is a view of the embodiment shown in FIG. 1 installed on a flatbed trailer.

A front view of the headboard system 1 is shown in FIG. 5. FIG. 4 shows an end bow of a tarp cover system engaged with the headboard system 1 (neither the tarp nor any other bows are shown). Furthermore, FIG. 6 shows one embodiment of the headboard system installed at the front end of a flatbed trailer.

Figure 2:
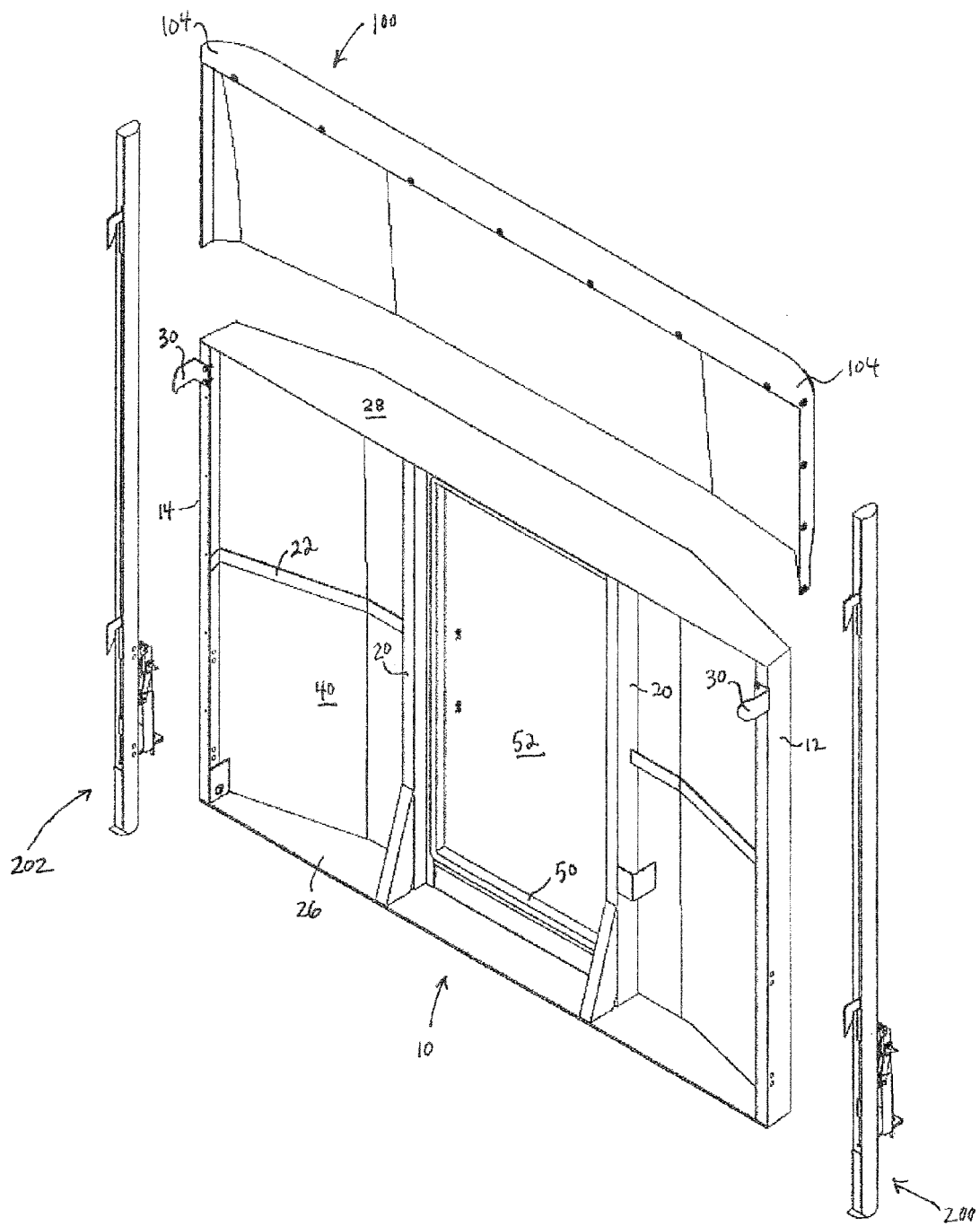
FIG. 2 is an exploded view of the embodiment shown in FIG. 1.

With reference now to FIG. 2, the headboard 10 serves as a primary support structure for the overall headboard system 1. More specifically, the headboard 10 is securely connected to an underlying substructure, such as a truck bed, trailer, or rail car, which will be described further below. The headboard extension 100 and the pair of vertically extending wings 200 and 202 are connected to and supported by the headboard 10. In addition to supporting other components of the headboard system 1, the headboard 10 can serve as an engagement or sealing surface for a cover system, and can also prevent cargo from sliding or otherwise moving off of the front end of the trailer, truck bed, or rail car.

In at least one embodiment, headboard 10 will have a width that corresponds substantially to the width of the substructure onto which it is to be mounted. For example, FIG. 6 shows a headboard 10 spanning the width of a trailer.

With reference to FIG. 2, headboard 10 comprises a lower edge defined by a lower plate 26 and an upper edge defined by an upper plate 28, as well as one or more vertical supports 20 extending between and connected to plates 26 and 28. Headboard 10 can also comprise further supports or braces to provide additional bracing, such as horizontal supports 22. One or more panels 40 can be connected by any suitable means to the support members as well as to upper and lower plates 26 and 28. In addition, one or more bow guide members 30 can be disposed on the rear facing edges of the headboard 10 for ensuring proper alignment of a bow with the headboard 10 and wings 200 and 202. Plates 26 and 28, supports 20 and 22 and panels 40 can be made of any suitable material, including but not limited to steel, aluminum, wood, and plastic. In one embodiment, one or more of these components will be made of a material having a high strength to weight ratio. In at least one embodiment, some or all of these components will be made substantially or wholly of aluminum.

Furthermore, in at least one embodiment, the headboard 10 has an aerodynamic shape. For example, headboard 10 shown in the Figures has a slightly curved or angled transverse cross-section. In addition, headboard 10 can comprise an opening 50 therein to allow for the passage of persons, cargo, equipment or other objects. The opening 50 will preferably be closable by way of a door 52 or other closure member.

In addition, the headboard 10 can be securely connected via its bottom edge or plate 26 to the trailer or truck bed by way of fasteners, welds, or by any other suitable means.

With reference to FIG. 1, headboard system 1 also comprises a pair of elongate wings 200 and 202. In at least one embodiment, the first wing 200 is at least substantially similar to second wing 202. The wings 200 and 202 can serve a number of functions, including to support headboard extension 100, and to support a locking mechanism for locking and securing an end bow of a cover system to the headboard 10. As best shown in FIG. 2, wings 200 and 202 have an elongate shape and are adapted to be connected to side edges 12 and 14 of headboard 10. In particular, a first wing 200 is connected to side edge 12 of headboard 10, whereas a second wing 202 is connected to opposite side edge 14. In at least one embodiment, wings 200 and 202 are releasably connected to headboard 10, thereby allowing for easy and quick assembly and disassembly of wings 200 and 202 to headboard 10. The releasable connection can be achieved by way of releasable fasteners, such as threaded bolts, or the like, or by any other releasable connection means known in the art.

Wings 200 and 202 can have lengths such that when they are connected to side edges 12 and 14 of headboard 10, the wings span at least the full height of headboard 10. In addition, wings 200 and 202 extend at least partially above top plate 28 of headboard 10 to support headboard extension 100. Wings 200 and 202 may also extend below bottom plate 26 of headboard 10. In at least one embodiment, the lower portions of wings 200 and 202 that extend below bottom plate 26 can be connected to the substructure on which the headboard system 1 is mounted. Wings 200 and 202 can be made of any suitable material, including by not limited to aluminum or steel.

Figure 3A:
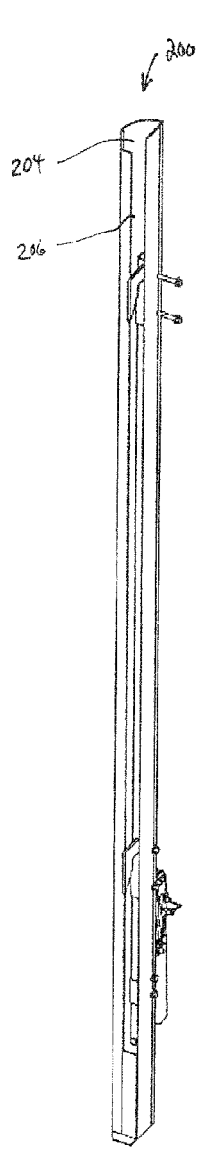
FIG. 3A is a perspective view of a wing and a locking mechanism.
Figure 3B:
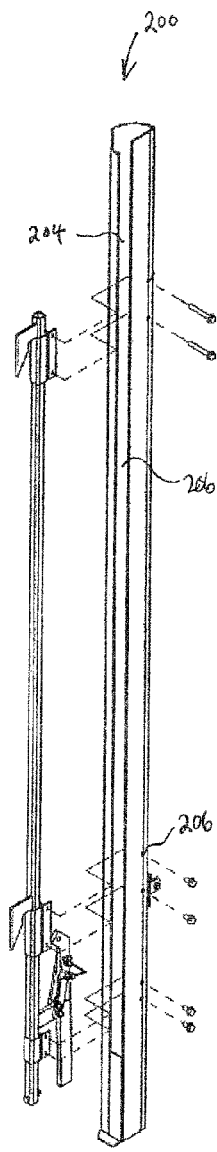
FIG. 3B is an exploded view of the wing and locking mechanism shown in FIG. 3A.
Figure 3C:
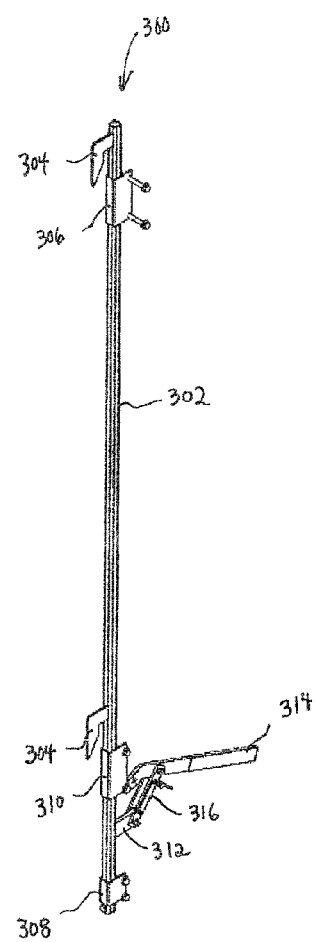
FIG. 3C is a perspective view of the locking mechanism shown in FIGS. 3A and 3B in an unlocked state.

As best shown in FIGS. 3A and 3B, in at least one embodiment, wings 200 and 202 comprise a hollow core portion 204 and at least one opening 206 into hollow core portion 204. In addition to reducing the weight of wings 200 and 202, the hollow core portion 204 can partly or wholly receive a locking mechanism. As mentioned above, a locking mechanism can lock and secure an end bow of a cover system to the headboard 10. As best shown in FIGS. 3B and 3C, in at least one embodiment the locking mechanism 300 comprises a moveable linkage member 302 having a substantially elongate shape, such as a rod. Rod 302 is movable along its longitudinal axis between a first position and a second position. In addition, rod 302 has one or more engagement members 304 connected thereto for engaging an end bow of a cover system when rod 302 is in the second position. In the embodiment shown in the Figures, locking mechanism 300 has two engagement members 304 in the form of hooks that are dis-posed at space-apart positions on the rod 302. However, it is to be understood that locking mechanism 300 can have a single engagement member or three or more engagement members. The rod 302 is slidable within the hollow core 204 of a wing, and is slidably retained in a wing by any suitable means, including by way of one or more rod guides 306, 308, 310 disposed inside of and statically connected to a wing. As best shown in FIG. 3B, rod guides 306, 308 and 310 can be connected to a wing by one or more fasteners.

As best illustrated in FIG. 3C, locking mechanism 300 can further comprise a handle 314 for actuating rod 302 and thus hooks 304. In at least one embodiment, a proximal end of handle 314 is pivotally connected to a rod guide, such as middle rod guide 310, which is statically connected to wing 200. Handle 314 can be mechanically coupled to rod 302 by way of a handle linkage member 316. A first end of handle linkage member 316 can be pivotally connected to a short protruding member 312 on rod 302, whereas the second end of handle linkage member 316 can be pivotally connected to handle 314. These components cooperate to transmit movement of handle 314 to rod 302 for moving hooks 304 between locked and unlocked positions. For example, in the embodiment shown in the Figures, moving the distal end of handle 314 from its position shown in FIG. 3B in an upward direction to its position shown in FIG. 3C moves rod 302 in an upward direction.

Although the hollow core portion 204 of a wing and the locking mechanism 300 are herein described and illustrated substantially with reference to wing 200, it is to be understood that this description also applies to wing 202, which in at least one embodiment is identical or substantially similar to wing 200.

The components of locking mechanism 300 herein described can be made of any suitable material. In at least one embodiment, the components of locking mechanism 300 will be made of steel. In addition, although locking mechanism 300 is described as being disposed in a hollow core portion of a wing, it will be appreciated that a locking mechanism can also be connected to the exterior surface of or proximate a wing or to headboard 10.

The engagement of the locking mechanism 300 with an end bow of a cover system will now be described. FIG. 4 shows an end bow 500 of a cover system positioned at the rear side of headboard system 1, the locking mechanisms 300 being in a locked position. The inset of FIG. 4 shows the engagement of one of the hooks 304 with a coupling member 502 on bow 500. Bow 500 will be unlocked from the headboard system 1 by lifting the handles 314 of both locking mechanisms 300 in an upward direction. This moves rods 302 and hooks 304 in an upward direction, thereby disengaging hooks 304 from coupling members 502 of bow 500.

As mentioned above, headboard system 1 also comprises a headboard extension 100. Extension 100 forms the upper part of headboard system 1 and is disposed at the upper edge of headboard 10. In at least one embodiment, the lower edge of extension 100 will partly overlap the upper and side edge portions 12 and 14 of headboard 10. Extension 100 preferably has a width that is approximately the same as the width of headboard 10. In addition, extension 100 can take any suitable shape, but is preferably shaped to correspond to the shape of the particular cover system with which headboard system 1 is to be used. For example, the top and side edges of extension 100 shown in FIG. 4 substantially align with the top and side edges of end bow 500. In at least one embodiment, extension 100 has an aerodynamic shape and profile.

As best shown in FIG. 1, the sides of extension 100 are connected to upper portions of wings 200 and 202 by way of fasteners or other suitable connector means. In at least one embodiment, headboard extension 100 is releasably connected to wings 200 and 202 by way of releasable fasteners of the type or types known in the art. In addition, the lower longitudinal edge of extension 100 can be connected to the upper portion of headboard 10. In at least one embodiment, a horizontal support (not shown) can be disposed between and connected to the tops or upper portions of wings 200 and 202. The upper longitudinal edge of extension 100 can then be connected to this horizontal support to further support and stabilize extension 100.

Extension 100 can be made of any suitable material known in the art. In at least one embodiment, extension 100 is made substantially or wholly of a lightweight material such as fibreglass, plastic, resin, or the like.

The vertical position of extension 100 relative to headboard 10 is adjustable, thereby allowing the overall height of headboard system 1 to be customized. This allows the height of headboard system 1 to be adjusted, even post-fabrication, to address the specific height requirements of a particular customer or end user. As shown in FIG. 1, in at least one embodiment the inner surfaces of the top corners or edges 104 of extension 100 are proximate the top ends of wings 200 and 202. In this way, the vertical edges of extension 100 are fully supported by the upper portions of wings 200 and 202. However, it will be appreciated that it is not crucial that the inner surface of top edges 104 of extension 100 be proximate the top ends of wings 200 and 202. There can be a gap between an inner edge 104 and top end of a wing.

The vertical position of extension 100 relative to headboard 10 can be adjusted by altering the amount by which wings 200 and 202 extend above upper plate 28 of headboard 10. For example, in the embodiment shown in FIG. 1, the vertical position of extension 100 can be lowered by shortening the upper portions of wings 200 and 202 that extend above top plate 28 before extension 100 is connected to the wings. Headboard system 1 will generally comprise wings 200 and 202 sized to extend, when connected to headboard 10, above top plate 28 of headboard 10 by a distance approximately equal to the height of headboard extension 100. In most cases this will provide the maximum overall height of the headboard system 1 since if the vertical position of extension 100 were increased any further a gap would be created between upper plate 28 of headboard 10 and the lower edge of extension 100. Again, the overall height of headboard system 1 can be decreased by shortening the upper portions of wings 200 and 202 that extend above top plate 28 before extension 100 is connected to the wings. It will also be appreciated that the vertical position of extension 100 can be raised so as to increase the overall height of headboard system 1. Extension 100 can simply be reconnected at a higher position on the upper portions of wings 200 and 202.

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A modular headboard system comprising:
    a headboard having a top edge, a bottom edge, a first side edge, and a second side edge opposite the first side edge;
    a first wing connected to the first side edge and extending at least partially above the top edge of the headboard;
    a second wing connected to the second side edge and extending at least partially above the top edge of the headboard;
    a headboard extension member disposed at the top edge of the headboard and connected to upper portions of the first and second wings, and
    at least one locking mechanism disposed proximate at least one of the wings for locking and securing a cover to the modular headboard system,
    wherein at least one of the wings comprises a hollow core portion and at least one opening into the core portion, and the at least one locking mechanism is at least partly disposed in the hollow core portion.

2. The modular headboard system of claim 1 wherein the first and second wings are releasably connected to the headboard.

3. The modular headboard system of claim 2 wherein the first and second wings are releasably connected to the headboard with one or more releasable fasteners.

4. The modular headboard system of claim 1 wherein the headboard extension member is releasably connected to the first and second wings.

5. The modular headboard system of claim 4 wherein the headboard extension member is releasably connected to the first and second wings with one or more releasable fasteners.

6. The modular headboard system of claim 1 wherein the first and second wings extend at least to the bottom edge of the headboard.

7. The modular headboard system of claim 1 wherein the headboard is made substantially of aluminum.

8. The modular headboard system of claim 1 wherein the headboard extension is made substantially of fibreglass.

9. The modular headboard system of claim 1 wherein the headboard extension is made substantially of plastic.

10. A cover system for use in the transportation or storage of cargo comprising the modular headboard system of claim 1.

11. A vehicle comprising the modular headboard system of claim 1.

12. A modular headboard system comprising:
    a headboard having a top edge, a bottom edge, a first side edge, and a second side edge opposite the first side edge;
    a first wing connected to the first side edge and extending at least partially above the top edge of the headboard;
    a second wing connected to the second side edge and extending at least partially above the top edge of the headboard; and
    a headboard extension member disposed at the top edge of the headboard and connected to upper portions of the first and second wings,
    wherein the vertical position of the headboard extension relative to the top edge of the headboard can be adjusted by changing the vertical position on the first and second wings at which the headboard extension is connected.

13. A modular headboard system comprising:
    a headboard having a top edge, a bottom edge, a first side edge, and a second side edge opposite the first side edge;
    a first wing connected to the first side edge and extending at least partially above the top edge of the headboard;
    a second wing connected to the second side edge and extending at least partially above the top edge of the headboard; and
    a headboard extension member disposed at the top edge of the headboard and connected to upper portions of the first and second wings,
    at least one locking mechanism disposed proximate at least one of the wings for locking and securing a cover to the modular headboard system,
    wherein the at least one locking mechanism comprises:
        a moveable linkage member movable between a first position and a second position;
        at least one guide for guiding movement of the movable linkage member; and
        at least one engagement member disposed on the movable linkage member for engaging a cover system when the movable linkage member is in the second position.

14. The modular headboard system of claim 13 wherein the at least one locking mechanism further comprises a handle mechanically coupled to the movable linkage member for actuating the movable linkage member.

* * * * *